UNITED STATES PATENT OFFICE.

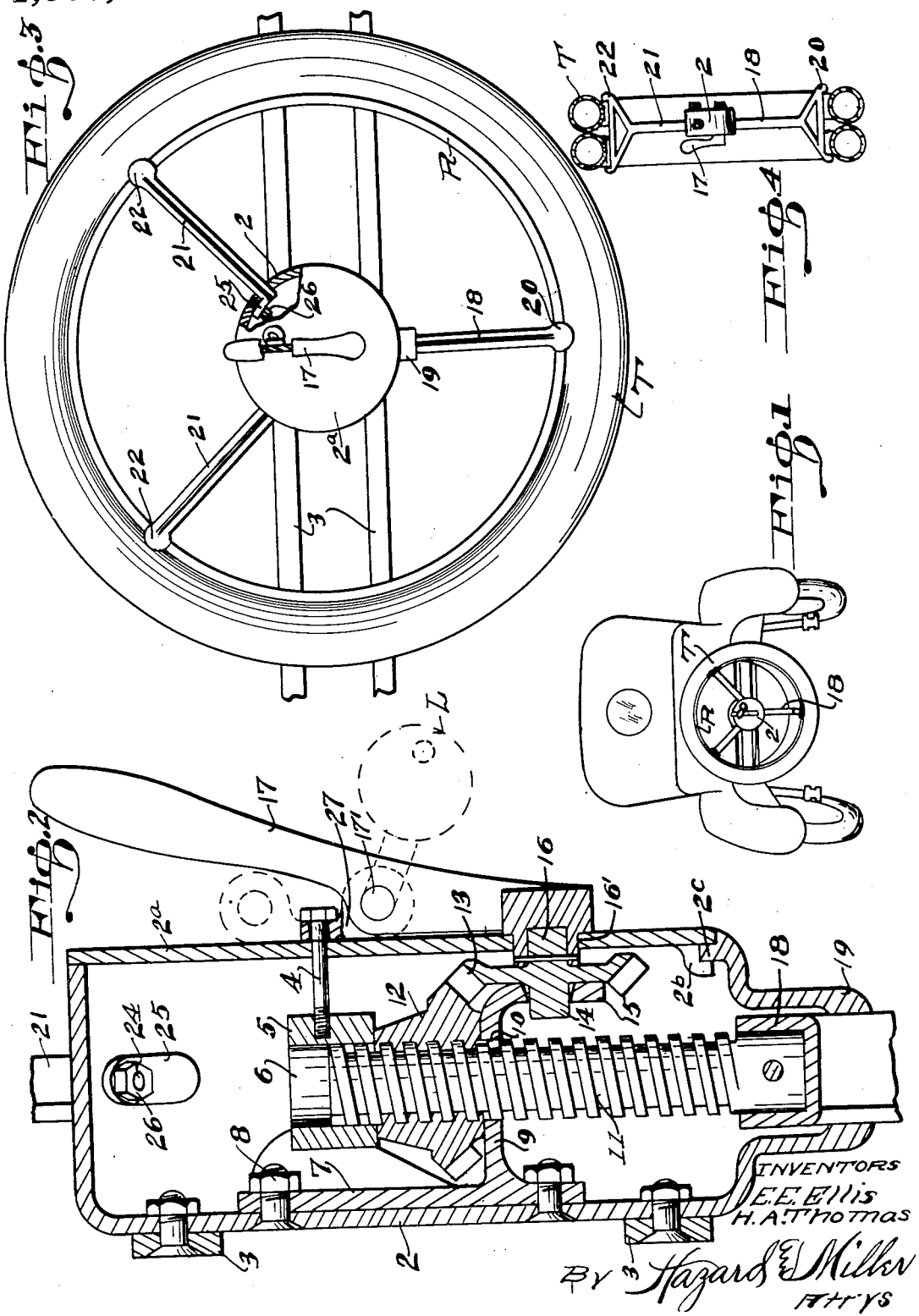

EDWARD E. ELLIS AND HERBERT A. THOMAS, OF ALHAMBRA, CALIFORNIA.

TIRE-CARRIER.

1,387,772.

Specification of Letters Patent. Patented Aug. 16, 1921.

Application filed March 4, 1920. Serial No. 363,152.

*To all whom it may concern:*

Be it known that we, EDWARD E. ELLIS and HERBERT A. THOMAS, citizens of the United States, residing at Alhambra, in the county of Los Angeles and State of California, have invented new and useful Improvements in Tire-Carriers, of which the following is a specification.

This invention relates to tire and rim carriers for vehicles and has for its object to provide a simple, substantial, practicable, compact and inexpensive device that may be readily attached to any suitable portion of a vehicle as the rear of an automobile, and a further object is to provide a device that can be rapidly adjusted to receive an applied rim or tire and then adjusted to lock it in place against removal and which device may be secured in the tire locking position. The invention consists of the construction, the combination and in details and arrangements of the parts, an embodiment of which invention is illustrated in the accompanying drawings and described and claimed herein.

Figure 1 is a perspective of the rear end of an automobile to which the device is shown applied.

Fig. 2 is a diametrical section through the device showing a jack rod in elevation.

Fig. 3 is a rear elevation of the device with an applied tire with parts in section.

Fig. 4 is a detail view showing the device adapted for carrying a plurality of applied rims and tires.

The rack or carrier consists of a central box 2 that may be made of pressed metal across the back of which is provided connecting bars or rods 3—3 the outer ends of which are designed to be secured to any suitable and convenient parts of the vehicle as shown in Fig. 1. The box 2 has a removable front cover 2ᵃ designed to be interlocked to the body of the box and readily secured by the application of a simple fastening means in the form of a screw 4.

To secure this simple attachment the lower portion of the cover 2ᵃ is provided on its inner face with a lug 2ᵇ in the form of a downwardly turned hook to engage an upwardly extending part 2ᶜ of the box 2. The fastening screw 4 is passed through an aperture provided therefor adjacent the central portion of the cap 2ᵃ and its inner threaded end engages a boss or bearing 5 having a bore 6, the bearing being formed on a bracket 7 that is bolted or otherwise secured as at 8 to the back or bottom of the box 2. This bracket 7 has an outwardly extending arm 9 perforated as at 10 to permit the introduction of a screw 11 the upper end of which is turnable in the bore 6 of the bearing 5. Interposed between the bearing 5 and the arm 9 is a bevel gear or pinion 12 internally threaded to fit the screw 11.

The pinion 12 and its screw 11 are arranged in a diametrical line across the box 2 which is preferably cylindrical, and in front of the gear 12 is arranged a complementary driving pinion 13 having a trunnion 14 running in a bearing part 15 on the front end of the arm 9. This trunnion is keyed or otherwise non-rotatively secured to the hub 16 of a manipulating handle or lever 17 arranged on the outside of the cover 2ᵃ; the hub 16 passing through an aperture 16′ provided therefore in the cover 2ᵃ. By this arrangement of the parts it will be seen that when the cover 2ᵃ is first fulcrumed on the lug 2ᶜ it can then be moved or swung inwardly so as to quickly mesh the gears 13 and 12 and then the fastening screw 4 is passed through the cover 2ᵃ and secured in the bearing part 5.

The lower end of the screw 11 is keyed or otherwise non-rotatably secured to the upper end of a radius arm 18 that is extended through a guide part 19 on the casing 2, and this radius arm has at its outer end a rim or tire engaging foot 20. Thus when the actuating handle 17 is rotated about the axis of its hub 16 the pinion 13 is revolved and turns the threaded pinion 12 with the result that the screw 11 is advanced or retracted according to the direction of rotation of the handle 17.

Coöperating with the radius arm or rack member 18 are others 21 of similar construction with rack engaging parts 22 at their outer ends, but these rack arms 21 are preferably rigidly secured to the casing 2, as shown in Figs. 2 and 3, by fastening studs 24 over which an angularly extending lug 25 on the inner end of each arm 21 is passed and fastened by a nut 26.

After the device has been mounted as desired on the body of the vehicle the adjustable rack rod or arm 18 may be retracted so that a tire T with its rim R may be placed on the upper ends of the arms 21—21 and the lower part of the tire or arm can be swung in below the lower end 20 of the adjustable rod 18. Then the attendant manipulates the lever 17 to rotate it about its center and by means of rotation of the gears 13—12 advance the screw 11 and by this force the arm 18 downwardly until its foot 20 engages and securely binds upon the adjacent inner surface of the rim or tire.

After this is done the handle 17 may be locked against surreptitious removal of the tire and rim, and to secure this locking there is pivotally arranged on the screw 4 a swinging eye 27 the aperture of which is designed to be brought into register with an aperture 17' in the handle 17 and then a padlock or other suitable fastening device L, shown in dotted lines in Fig. 2, can be attached by passing its shackle through the aperture of the eye 27 and the aperture 17' of the lever 17. The eye 27 is movably mounted on the screw 4 so that it can be turned out of the path of rotation of the handle 17 to permit the free operation of the latter when it is unlocked, as is shown by the dotted lines, Fig. 2.

It is obvious that various changes may be made without departing from the spirit of the invention as claimed.

What is claimed is:

1. In a tire carrier, a housing, fixed arms projecting radially therefrom, a bracket fixed within said housing, a bearing member positioned above said bracket, a radially arranged arm having its inner end adapted to move through the wall of the housing, a threaded shank secured to the inner end of said movable arm and disposed within said housing, a beveled pinion screw-seated on said threaded shank and positioned between said bracket and bearing, a handle having a portion rotatably arranged in the wall of the housing, and a beveled pinion carried by the inner end of said handle and engaging the teeth of the first mentioned beveled pinion.

2. In a tire carrier, a housing, fixed arms projecting radially therefrom, a bracket fixed within said housing, a bearing member positioned above said bracket, a radially arranged arm having its inner end adapted to move through the wall of the housing, a threaded shank secured to the inner end of said movable arm and disposed within said housing, a beveled pinion screw-seated on said threaded shank and positioned between said bracket and bearing, a handle having a portion rotatably arranged in the wall of the housing, a beveled pinion carried by the inner end of said handle and engaging the teeth of the first mentioned beveled pinion, and a perforated lug on the exterior of the housing, which lug is adapted to receive a handle locking device.

In testimony whereof we have signed our names to this specification.

EDWARD E. ELLIS.
HERBERT A. THOMAS.